United States Patent
Evans et al.

(10) Patent No.: US 6,602,015 B1
(45) Date of Patent: Aug. 5, 2003

(54) REMOVABLE BICYCLE BEAM

(75) Inventors: Matthew R. Evans, Stoughton, WI (US); Clint D. Kolda, Cottage Grove, WI (US); Mark A. Dahl, Rice Lake, WI (US)

(73) Assignee: Graber Products, Inc., Madison, WI (US)

(*) Notice: Subject to any disclaimer, the term of this patent is extended or adjusted under 35 U.S.C. 154(b) by 0 days.

(21) Appl. No.: 09/919,714

(22) Filed: Aug. 1, 2001

(51) Int. Cl.$^7$ .................................................. F16B 7/10
(52) U.S. Cl. .............................. 403/109.1; 403/109.5; 224/924; 24/598.5
(58) Field of Search ................... 403/109.1, 109.2, 403/109.5, 109.7, 109.8, 322.2, 300, 309, 347; 24/598.5, 598.6, 599.9, 600.2, 373; 224/524

(56) References Cited

U.S. PATENT DOCUMENTS

| | | | | |
|---|---|---|---|---|
| 3,972,456 A | * | 8/1976 | Saffold | 224/402 |
| 5,149,112 A | * | 9/1992 | Nauman et al. | 280/278 |
| 5,169,042 A | * | 12/1992 | Ching | 224/497 |
| 5,282,555 A | * | 2/1994 | Muir et al. | 224/532 |
| D371,332 S | * | 7/1996 | Chapple et al. | D12/114 |
| 5,558,349 A | * | 9/1996 | Rubin | 280/287 |
| 5,639,001 A | * | 6/1997 | Brady | 224/416 |

OTHER PUBLICATIONS

"Destination; Recreation" Brochure 12458, 01/00, Graber Products, 5253 Verona Road, Madison, WI 53711, p. 8.

"Bauer Vehicle Gear" Brochure 2000, Bauer Vehicle Gear, 601 W. Walnut Street, Compton, CA 90220, p. 7.

* cited by examiner

Primary Examiner—Lynne H. Browne
Assistant Examiner—James M. Hewitt
(74) Attorney, Agent, or Firm—Boyle, Fredrickson, Newholm, Stein & Gratz, S.C.

(57) ABSTRACT

A removable bicycle beam for adapting a bicycle frame for engagement with a vehicle-mounted bicycle rack. The beam includes a pair of securing mechanisms disposed on opposite ends of a central body. Each securing mechanism includes a fixed arm fixedly secured to the central body and a pivoting arm pivotally secured to the central body. Each arm includes a gripping portion extending outwardly from the central body that cooperates with the gripping portion of the other arm to releasably encircle and engage a component of the bicycle, such as the handle bar stem or the seat post. The pivoting arm and fixed arm lie in a substantially horizontal plane when in a closed position, and the pivoting arm is movable in the horizontal plane toward and away from the fixed arm. Each pivoting arm can be locked in a closed, engaged position by one of a pair of releasable latch mechanisms disposed within the central body and engagable with the pivoting arms. The central body is formed of a pair of telescopically mounted tubes that enable the beam to shift the securing mechanisms with respect to one another in order to accommodate bicycles having various lengths between the handle bar stem and the seat post.

23 Claims, 3 Drawing Sheets

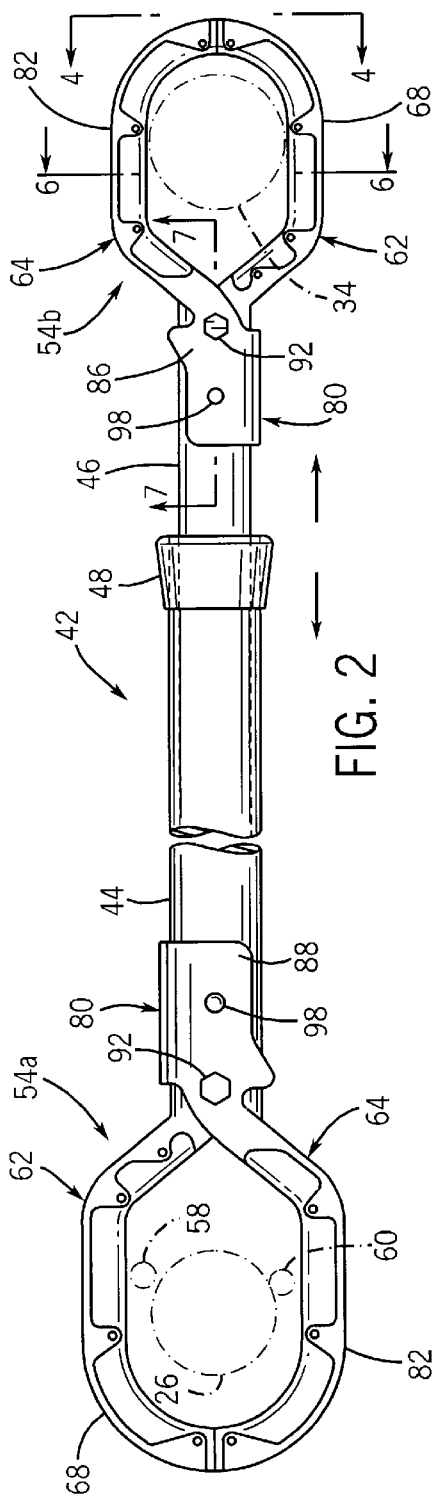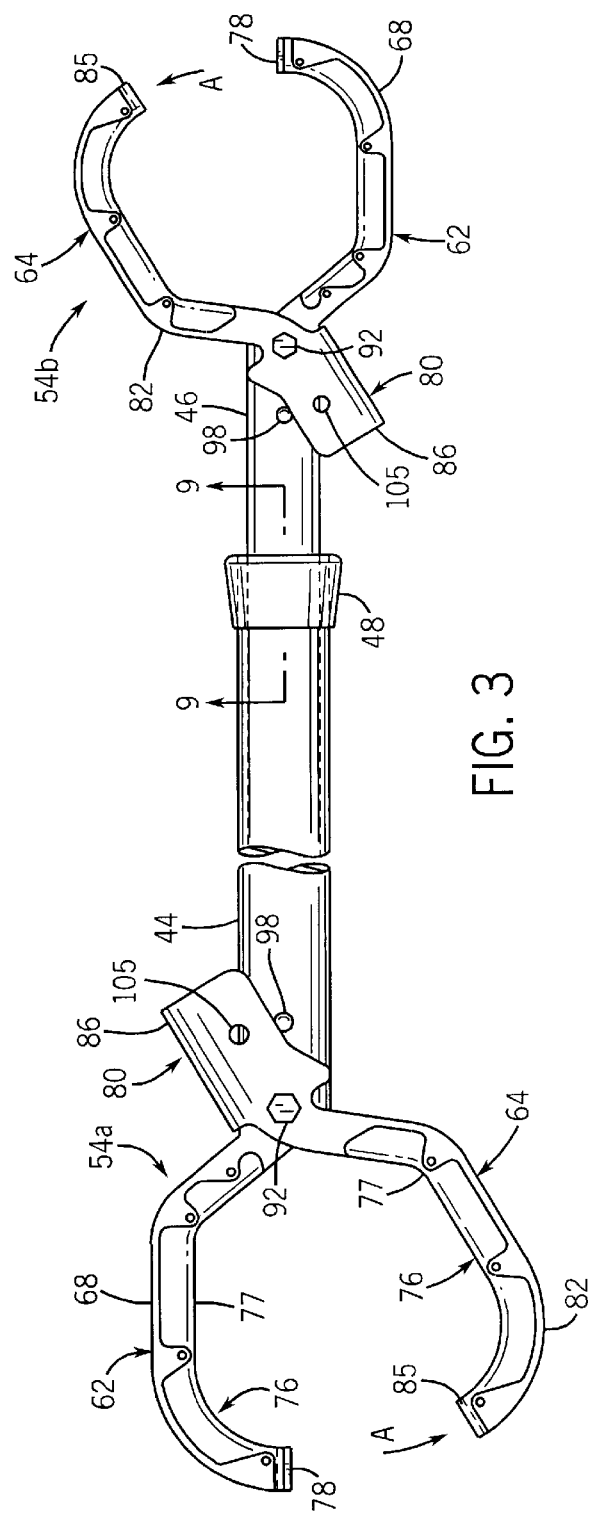

REMOVABLE BICYCLE BEAM

The present invention is related to bicycles and bicycle carriers, and more specifically to a beam releasably securable between the seat post and handle bars of a bicycle to enable the bicycle to be mounted on a vehicle-mounted bicycle carrier rack.

BACKGROUND OF THE INVENTION

In order to transport bicycles from one place to another, a number of vehicle-mounted bicycle racks have been developed. These racks enable bicycles to be supported on the rear of a vehicle for transportation along with the vehicle. Certain racks utilize a support arrangement that engages a generally horizontal top tube extending across the top of the frame of the bicycle, such that the bicycle is carried in a suspended manner by engagement of the support arrangement with the top tubes.

Conventional bicycle frames designed for females do not have a top tube which can be utilized to support the bicycle on a rack. Further, with recent advancements in bicycle frame technology, many other bicycle frames are configured without a top tube. Such bicycle frames thus require use of a removable bicycle beam in order to support the bicycle in a suspended manner on a vehicle-mounted bicycle rack which has a support arrangement adapted to engage the top tube of a bicycle frame.

Removable bicycle beams or bars have been developed so as to enable bicycle frames without a conventional top tube to be carried in a suspended manner on a bicycle carrier. A removable bicycle beam or bar is temporarily secured between the handle bar stem and seat post of the bicycle in order to enable a bicycle without a top tube to be mounted to and transported by a suspension-type vehicle-mounted bicycle carrier. The beam or bar is adjustable to fit bicycles having varying distances between the handle bar stem and the seat post.

Known bicycle beams are generally in the form of a telescoping bar having a seat post mounting arrangement at one end and a handle bar stem mounting arrangement at the opposite end. The seat post mounting arrangement and the handle bar stem mounting arrangement are generally similar in construction. In one known prior art bicycle beam, a U-shaped bracket is engaged via a cross pin with each end of the telescoping bar. The bracket can be selectively disengaged from the cross pin to allow either the seat post or the handle bar stem to be received within the bracket, and bracket is subsequently reengaged with the cross pin. In another form, a hook-type member is mounted to each end of the telescoping bar, and is engageable with either the seat post of the handle bar stem. A pivotable latch bar is mounted to the end of the telescoping bar, and is movable between an open position which allows the seat post or handle bar stem to be engaged with the hook member, and a closed position in which the latch bar cooperates with the hook member to maintain the seat post or handle bar stem in engagement with the hook member. The latch bar is mounted to a horizontal cross pin, such that the latch bar is movable in a vertical direction between its open and closed positions.

While these types of bicycle beams function satisfactorily to allow a bicycle to be mounted to a suspension-type carrier, each has certain drawbacks in ease of use and in the manner in which the bicycle beam is secured to the handle bar stem and seat post. The bracket type mounting arrangement involves several steps in opening the bracket, engaging the bracket with the bicycle, and then engaging the bracket with the cross pin. The hook-type mounting arrangement requires separate manual operations in opening the latch bar, extending the telescoping bar an amount sufficient to engage the hook members with the seat post and handle bar stem, shortening the telescoping bar to engage the hook members with the respective seat and handle bar stems, and then moving each latch bar to its closed position.

SUMMARY OF THE INVENTION

It is an object of the present invention to provide an improved removable bicycle beam for use with a bicycle frame that does not include a top tube, for enabling the bicycle to be engaged with a bicycle carrier in a suspended manner.

It is a further object of the invention to provide such a removable bicycle beam that has a relatively simple construction and is adaptable to fit bicycles having a variety of lengths between the handle bar stem and the seat post.

It is still a further object of the present invention to provide such a removable bicycle beam that has an easily engagable and disengagable securing mechanism for releasably engaging one or both of its ends with the handle bar stem and/or seat post of the bicycle.

It is still another object of the present invention to provide a removable bicycle beam in which the securing mechanism is formed such that the mechanism does not damage the handle bar stem or seat post when the beam is secured to the bicycle.

It is still a further object of the present invention to provide a bicycle beam in which the securing mechanism defines a wide opening when the mechanism is opened in order to allow for easy attachment of the beam to the handle bar stem or seat post of the bicycle.

The present invention is a removable bicycle beam securable to a bicycle between the handle bar stem and seat post of the bicycle. The beam provides a horizontal bar extending between the handle bar stem and seat post of the bicycle that is engagable with a vehicle-mounted bicycle rack adapted to secure a horizontal member of a bicycle frame to enable the bicycle to be secured to and transported by the rack.

The beam is formed of a pair of telescoping tubular members. The tubular members are slidably engaged with one another to enable the beam to be adjusted in length, according to the distance between the handle bar stem and seat post of the bicycle.

The beam defines a pair of spaced apart ends, at least one of which includes an engagement arrangement or securing mechanism that is releasably engagable with the handle bar stem and/or seat post of the bicycle. In a preferred form, a similarly constructed releasable securing mechanism is provided at both ends of the beam. The releasable securing mechanism includes a pair of arms secured to an end of the beam. A first one of the arms is fixedly attached to the end of the beam, and a second one of the arms is pivotally secured to the beam for movement toward and away from the first arm. The pivoting second arm is releasably engagable with a detent mechanism associated with the beam that retains the pivoting arm in a closed position, in which the first and second arms are in engagement with each other. When in the closed position, the first and second arms define a closed opening or space within which the handle bar stem or seat post of the bicycle is received. When the releasable securing mechanism is disengaged, the second arm is pivoted away from the first arm to an open position, in which a gap is defined between the ends of the first and second arms. The gap allows the bicycle seat post or handle bar stem to be moved into or out of the space between the first and second arms.

The first and second arms include a mating retainer arrangement which maintains the arms together against vertical forces applied to the arms in use, which would otherwise tend to separate the arms. The mating retainer arrangement may be in the form of a notch formed in the end of one of the arms, and a mating tab formed at the end of the other arm. The notch is releasably engaged with the when the pivoting arm is in the closed position. The engagement of the tab and the notch ensures that the fixed and pivoting arms of the securing mechanism do not slide apart with respect to one another when engaged around the seat post or handle bar stem of the bicycle.

Both the fixed and securing arms also include a relatively soft resilient material disposed along an area defined by each arm. The resilient material is in an area which contacts the handle bar stem or seat post of the bicycle, as well as the handle bars or seat when the beam is engaged with the bicycle. The resilient material engages the securing mechanism with the bicycle and prevents damage to the bicycle frame from the securing mechanism when the mechanism rubs against the bicycle components during use.

Various other features, objects and advantages of the invention will be made apparent from the following detailed description taken together with the drawn figures.

BRIEF DESCRIPTION OF THE DRAWINGS

The drawing figures illustrate the best mode presently contemplated for practicing the present invention.

In the drawings:

FIG. 2 is a top plan view of the bicycle beam of FIG. 1 showing the pivoting arm in a closed position, with reference to line 2—2 of FIG. 1;

FIG. 3 is a top plan view similar to FIG. 2 illustrating the pivoting arm of each securing mechanisms in an open position;

DETAILED DESCRIPTION OF THE INVENTION

Figure 1:
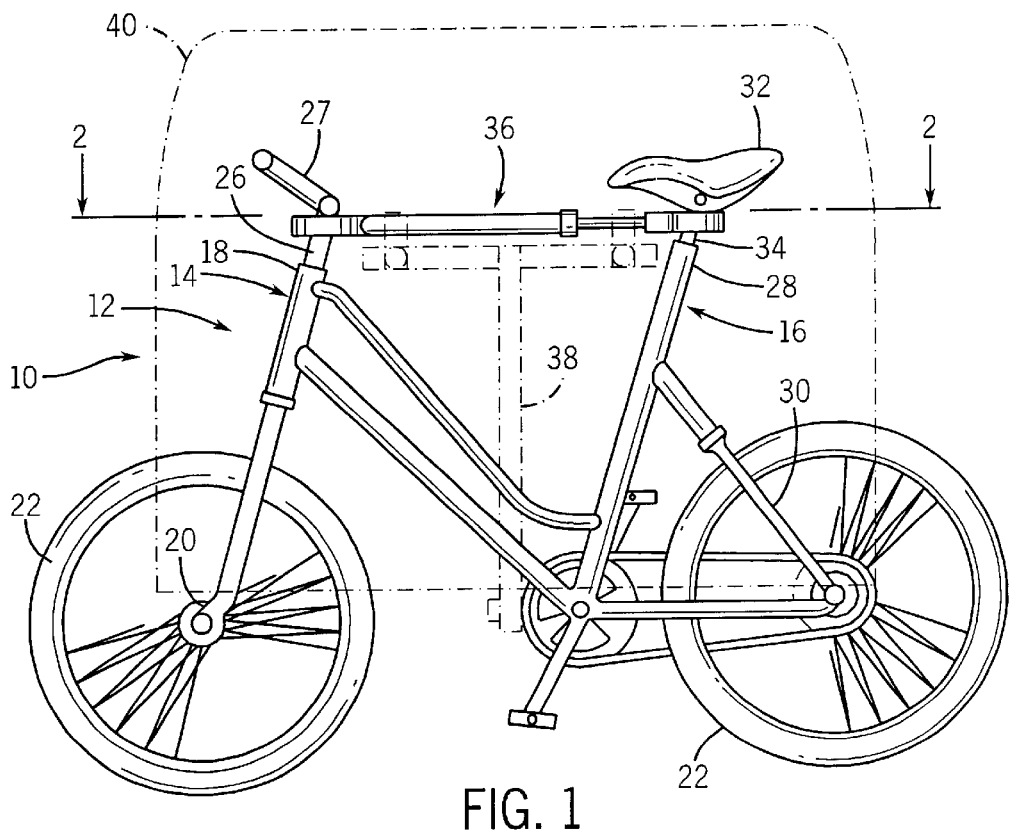
FIG. 1 is a side elevation view of a bicycle beam constructed according to the present invention secured to a bicycle and engaged with a vehicle-mounted bicycle rack.

With reference now to the drawing figures in which like reference numerals designate like parts throughout the disclosure, a bicycle is indicated generally at 10 in FIG. 1. The bicycle 10 has a frame 12 including a front end 14 and a rear end 16. The front end 14 has a steering tube 18 and a fork 20, with a front wheel 22 secured to the fork 20. Fork 20 includes a handle bar stem 26 which extends through steering tube 18, and a set of handle bars 27 is engaged with the upper end of handle bar stem 26. The rear end 16 of the frame 12 includes a seat tube 28 and a rear fork 30, with a rear wheel 22 secured to the rear fork 30 and a seat 32 secured to the seat tube 28 by seat post 34 slidably engaged with the seat tube 28. A bicycle beam 36, constructed according to the invention, is removably secured to the bicycle 10 between the handle bar stem 26 and seat post 34. The bicycle beam 36 is adapted for use in mounting bicycle 10 to a vehicle-mounted bicycle rack 38 shown attached to the rear of a vehicle 40.

Figure 9:
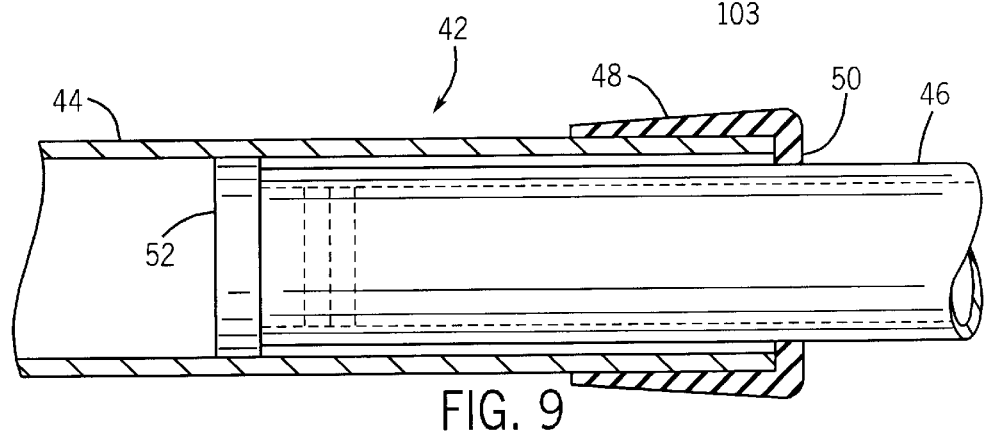
FIG. 9 is a partial cross-sectional view along line 9—9 of FIG. 3.

Referring to FIGS. 2 and 9, the bicycle beam 36 includes a central body 42 formed of a first hollow tube 44 and a second hollow tube 46 telescopically mounted within the first tube 44. The tubes 44, 46 are formed of a rigid material capable of withstanding the stress of supporting the weight of the bicycle 10 when engaged with the rack 38, such as a rigid plastic or metal, with aluminum being particularly preferred. The first tube 44 includes a seal 48 at one end through which the second tube 46 extends. The seal 48 extends circumferentially around the end of the first tube 44 and includes a central opening 50 having a diameter slightly greater than the outer diameter the second tube 46. The seal 48 frictionally engages the exterior of the second tube 46 and partially covers the interior of the first tube 44 to prevent water, rocks, dirt and other material from entering the first tube 44.

A detent 52 is attached to the end of the second tube 46 disposed within the first tube 44. The detent 52 has an exterior diameter slightly less then the interior diameter of the first tube 44 and may slide within the first tube 44 along with the second tube 46. When the second tube 46 is in the fully extended position, the detent 52 engages seal 48 outwardly of the opening 50, to normally retain the second tube 46 within the first tube 44.

Referring now to FIGS. 2–8, opposite the seal 48 and detent 52, the first tube 44 and second tube 46 each include an engagement arrangement in the form of a releasable securing mechanism 54a and 54b, respectively. Each securing mechanism 54a and 54b is formed generally identically to the other. However, the securing mechanism 54a on the first tube 44 is slightly larger than the securing mechanism 54b on the second tube 46, because the securing mechanism 54a is adapted to be engaged with the front end of bicycle 10, which includes the handle bar stem 26 as well as a brake cable 58 and a gear shift cable 60 which extend downwardly along opposite sides of the handle bar stem 26. Securing mechanism 54b, on the other hand, is adapted to be engaged with seat post 34 which does not typically have any adjacent cables or the like. Like reference characters will be used to describe both securing mechanisms 54a and 54b.

As best shown in FIGS. 3—7, each securing mechanism 54a and 54b includes a fixed arm 62 and a pivoting arm 64 that are formed of a rigid material similar to that used to form the tubes 44, 46. The fixed arm 62 and pivoting arm 64 can be placed in a closed, engaged position to form an enclosure around the handle bar stem 26 or seat post 34 or in an open, disengaged position in which the fixed arm 62 and pivoting arm 64 are separated enabling the handle bar stem 26 or seat post 34 to be removed from or placed between the arms 62 and 64.

Figure 4:
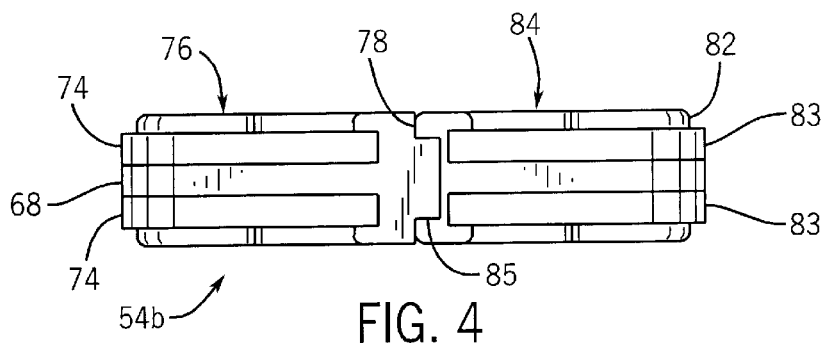
FIG. 4 is an end elevation view of the securing mechanism with the pivoting arm in the closed position, with reference to line 4—4 of FIG. 2.
Figure 5:
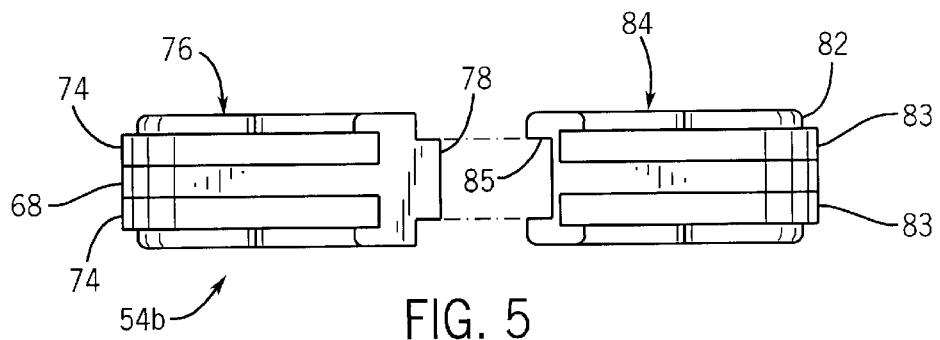
FIG. 5 is an end elevation view similar to FIG. 4 illustrating the securing mechanism with the pivoting arm in the closed position, with reference to line 5—5 of FIG. 3.
Figure 6:
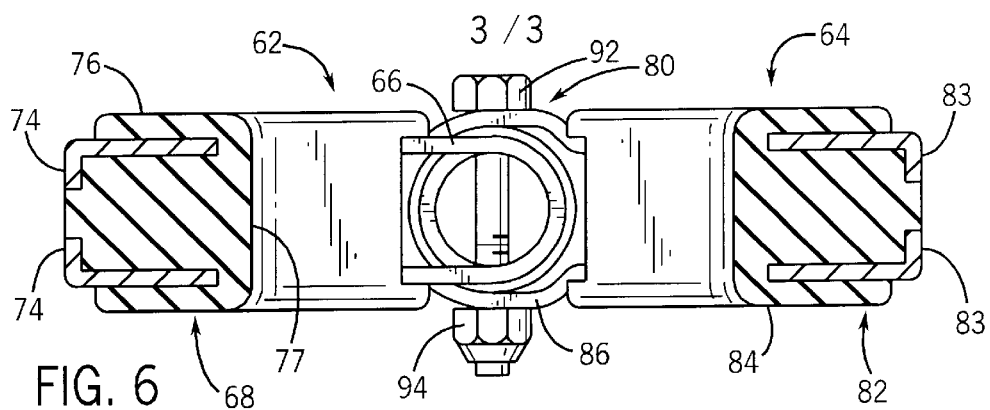
FIG. 6 is a cross-sectional view along line 6—6 of FIG. 2.
Figure 7:
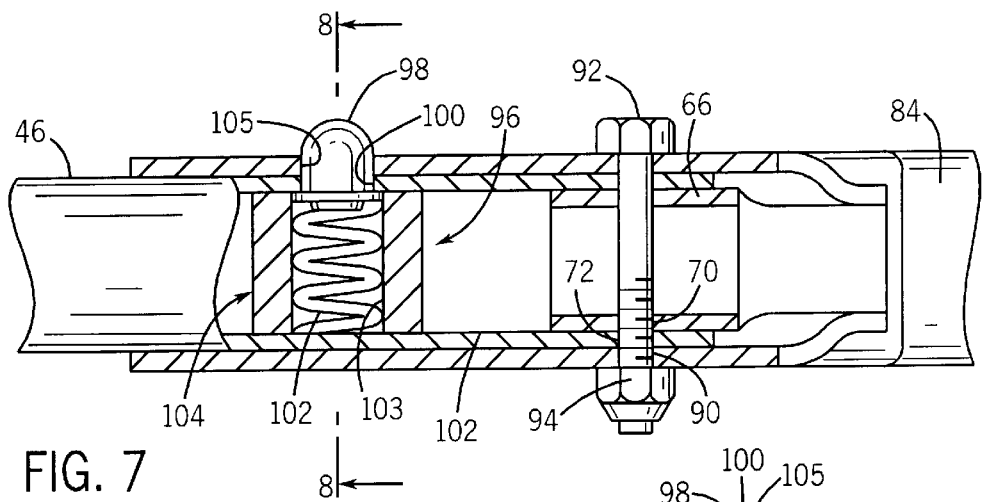
FIG. 7 is a partial cross-sectional view along line 7—7 of FIG. 2.
Figure 8:
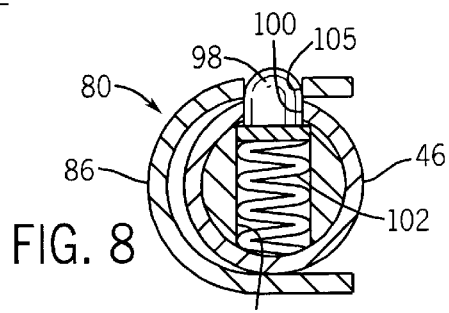
FIG. 8 is a cross-sectional view along line 8—8 of FIG. 7.

The fixed arm 62 includes an attachment portion 66 secured to the respective tube 44 or 46 and a gripping portion 68 extending outwardly from the attachment portion 66. The attachment portion 66 is insertable into one of the respective tubes 44, 46 and includes a pair of opposed openings 70 that are alignable with a pair of opposed bores 72 located in the tube 44 or 46 opposite the seal 48 or detent 52, respectively. Opposite the openings 70, the gripping portion 68 includes a pair of extensions 74 extending outwardly from the attachment portion 66. The extensions 74 are integrally formed with the attachment portion 66 and support a resilient pad 76 disposed partially around the extensions 74. The pad 76 may be overmolded onto extensions 74, and forms a continuous inner surface 77 that faces the pivoting arm 64 and engages the handle bar stem 26 or seat post 34. The pad 76 is formed of a resilient material, such as a soft thermoplastic or rubber material, capable of frictionally engaging but not scratching or otherwise damaging the handle bar stem 26 or seat post 34 of the bicycle 10 to which the beam 36 is secured. Furthermore, as best shown in FIGS. 4 and 5, the end of the pad 76 opposite the attachment portion 66 further includes a tab 78 extending outwardly from the pad 76.

The pivoting arm 64 is formed similarly to the fixed arm 62 and includes an attachment portion 80 and a gripping portion 82. The gripping portion 82 is formed similarly to the gripping portion 68 of the fixed arm 62 including a pair of extensions 83 extending from the attachment portion 80 and an overmolded pad 84 disposed around the extensions 83. However, the pad 84 has a notch 85 located on the end of the pad 84 opposite the attachment portion 80. The notch 85 is selectively engagable with the tab 78 on the gripping portion 68 of the fixed arm 62 when the securing mechanism 54a or 54b is in the closed position. The engagement of the tab 78 within the notch 85 prevents the fixed arm 62 and pivoting arm 64 from sliding with respect to one another and either damaging the handle bar stem 26 or seat post 34, or disengaging the securing mechanism 54a or 54b.

The attachment portion 80 of the pivoting arm 64 is formed of a sleeve 86 defining an open end 88 and having an inner dimension slightly larger than the outer diameter of the tube 44 or 46 to which the securing mechanism 54a or 54b is attached. The shape of the sleeve 86 preferably conforms to the shape of the respective tube 44 or 46, but might also have any shape capable of pivoting around the tubes 44 and 46 in the desired manner, such as a rectangular shape. The sleeve 86 also includes a pair of apertures 90 disposed adjacent the gripping portion 82 that are alignable with the openings 70 in the fixed arm 62 and bores 72 in the respective tube 44 or 46.

To secure the fixed arm 62 and pivoting arm 64 to the respective tube 44 or 46, the apertures 90 in the pivoting arm 64, the openings 70 in the fixed arm 62 and the bores 72 in the tube 44 or 46 are aligned. This is accomplished by placing the attachment portion 66 of the fixed arm 62 within the tube 44 or 46 and placing the attachment portion 80 of the pivoting arm 64 around the tube 44 or 46 and the attachment portion 66 of the fixed arm 62. Once the apertures 90, bores 72 and openings 70 are in alignment, a bolt 92 is inserted through the respective openings and secured therein by a nut 94 threadably engaged with one end of the bolt 92. The bolt 92 fixedly secures the fixed arm 62 within the tube 44 or 46 and provides a pivot point for the pivoting arm 64 with respect to the tube 44 or 46.

To releasably retain the pivoting arm 64 of each securing mechanism 54a and 54b in a closed position about the handle bar stem 26 or seat post 34, the tubes 44 and 46 also each include a latch mechanism 96 disposed within the tubes 44 and 46. The latch mechanism 96 is disposed adjacent the attachment portion 66 of fixed arm 62 and includes a ball-type latch 98 slidably disposed within a latch opening 100 that is in axial alignment with but spaced from one of the bores 72 in the tube 44 or 46. The latch 98 is biased to an outward position in the opening 100 by a spring 102 located within a passage 103 defined by a latch retainer 104 received within the interior of tube 44 or 46. The spring 102 enables the latch 98 to be depressed downwardly into the opening 100 to a position where the latch 98 is disengaged from pivoting arm attachment portion 80 to enable attachment portion 80 be moved towards or away from the tube 44 or 46.

To lock the pivoting arm 64 of each securing mechanism 54a and 54b in a closed position, the pivoting arm 64 is pivoted about the bolt 92 toward its closed position from its open position, to move the sleeve 86 toward the tube 44 or 46. Sleeve 86 engages latch 98 to depress latch 98 against the force of spring 102. Continued movement of sleeve 86 toward tube 44 or 46 brings a latch hole 105 in sleeve 86 into alignment with latch 98, and spring 102 then forces latch 98 upwardly through the opening 100 in the tube 44 or 46 and into latch hole 105. The latch hole 105 is spaced from the apertures 90 opposite the gripping portion 82 and is in alignment with the latch opening 100 when the pivoting arm 64 is in the closed position. The engagement of the latch 98 within the latch hole 105 prevents the pivoting movement of the sleeve 86 on the pivoting arm 64 to retain the gripping portion 82 and notch 85 in engagement with the handle bar stem 26 or seat post 34 and the gripping portion 68 and tab 76 of fixed arm 62.

To disengage the pivoting arms 64 of the securing mechanisms 54a and 54b, the latch 98 is depressed downwardly through the latch hole 105 and latch opening 100 into the tube 44 or 46, against the force of spring 102. The sleeve 86 and pivoting arm 64 can then be pivoted about the bolt 92 in the direction shown in FIG. 3 by arrows A to disengage the tab 78 on the fixed arm 62 from the notch 85 on the pivoting arm 64 and enable the securing mechanisms 54a or 54b to be removed from around the handle bar stem 26 or seat post 34.

To utilize the bicycle beam 36, initially each of the securing mechanisms 54a and 54b are placed in the disengaged, open position by depressing each of the latches 98 and moving each pivoting arm 64 away from the fixed arm 62, such that the beam 36 is the configuration shown in FIG. 3. The beam 36 is then positioned between the handle bar stem 26 and seat post 34 of the bicycle 10 and adjusted in length by sliding the second tube 46 inwardly or outwardly with respect to the first tube 44 until the securing mechanisms 54a and 54b are positioned around the handle bar stem 26 and seat post 34, respectively. The pivoting arms 64 are then moved towards the fixed arms 62 by gripping each sleeve 86 and the respective tube 44 or 46, and applying a squeezing force to move sleeve 86 toward tube 44 or 46 by pivoting movement about bolt 92. This functions to move gripping portion 82 toward fixed arm 62. The user continues to apply the squeezing force to sleeve 86, and sleeve 86 contacts latch 98 to depress latch 98 against the force of spring 102. As pivoting arm 64 reaches fixed arm 62, the notch 85 on each pivoting arm 64 engages the tab 78 on each fixed arm 62, and latch hole 105 is moved into alignment with its respective latch 98. When the securing mechanisms 54a and 54b are each in the engaged position around the handle bar stem 26 and seat post 34 as shown in FIG. 2, the springs 102 force the latches 98 into the latch holes 105 to retain the mechanisms 54a and 54b in the closed or engaged position, and the beam 36 can be engaged within the bicycle rack 38 on the rear of the vehicle.

To disengage the mechanisms 54a and 54b, the latches 98 are depressed through the latch holes 105 and into the beams 44 and 46 such that the pivoting arms 64 can be moved away from the fixed arms 62. The first tube 44 and second tube 46 can then be slid towards one another to remove the mechanisms 54a and 54b from around the neck 26 and seat post 34.

In an alternative operation, the user can first engage one of securing mechanisms 54a and 54b with its respective bicycle component, such as handle bar stem 26 and seat post 34, respectively, and then adjust the length of central body 42 and then engage the other securing mechanism 54a, 54b with its respective flexible component. In addition, while pivoting arms 64 are described as being closed by applying a squeezing force to sleeve 86, pivoting arm 64 may also be moved to its closed position by applying a lateral force directly to gripping portion 82, to move gripping portion 82 toward fixed arm 62. In a manner similar to that described above, this causes pivoting movement of pivoting arm 64 about bolt 92, and engagement of sleeve 86 with latch 98, to first depress latch 98 and then move latch hole 105 over latch 98 when pivoting arm 64 reaches its closed position of FIG. 2.

While the foregoing description illustrates the best mode currently contemplated of practicing the present invention, other alternative constructions are also contemplated. For example, the beam 36 could comprise a single, non-extendable tube having securing mechanisms 54a and 54b at either end. Also, the beam 36 could include only a single securing mechanism 54a or 54b at one end, with a separate, different attachment structure located on the beam 36 opposite the securing mechanism. Engagement of the outer ends of pivoting arm 64 and fixed arm 62 may take a form other than the specific arrangement of tab 78 and notch 85 as shown and described. The latch mechanism which maintains the pivoting arm 64 in its closed position may also take a form other than the specific details of latch 98 and latch holes 105, and may be any satisfactory type of releasable securing arrangement.

Various alternatives are contemplated as being within the scope of the following claims which particularly pointing out and distinctly claim the subject matter regarded as the invention.

We claim:

1. An apparatus for converting a bicycle for attachment to a vehicle-mounted bicycle rack, the apparatus comprising:
    a central body having an outer dimension and opposed bores adjacent one end of the central body, and a latch opening spaced from one of the bores;
    a releasable latching mechanism including a latch slidably retained within the latch opening; and
    a securing assembly disposed on the one end of the central body, the securing assembly comprising;
        a) a fixed arm having an attachment portion secured to the central body and a gripping portion extending outwardly from the attachment portion; and
        b) a pivoting arm having a sleeve pivotally secured to the opposed bores of the central body and a gripping portion extending outwardly from the sleeve, the sleeve having an inner dimension greater than the outer dimension of the central body, a pair of apertures aligned with the opposed bores of the central body and a latch hole selectively alignable with the latch opening and engagable with the latch.

2. The apparatus of claim 1 wherein the central body comprises a tubular member and wherein the attachment portion of the fixed arm has an outer dimension less than an inner dimension defined by the central body and is secured within the central body.

3. The apparatus of claim 2 wherein the attachment portion of the fixed arm includes opposed openings alignable with the opposed bores of the central body and the apertures in the sleeve of the pivoting arm.

4. The apparatus of claim 3 further comprising a bolt inserted through the opposed bores of the central body, the openings in the fixed arm and the apertures in the pivoting arm to secure the fixed arm and pivoting arm to the central body.

5. The apparatus of claim 1 further comprising:
    a first resilient pad disposed on the gripping portion of the fixed arm; and
    a second resilient pad disposed on the gripping portion of the pivoting arm.

6. The apparatus of claim 5 wherein the first pad and second pad are releasably engagable with one another.

7. An apparatus for converting a bicycle for attachment to a vehicle-mounted bicycle rack, the apparatus comprising:
    a first hollow central body having an outer dimension and an inner dimension, a first pair of opposed bores at one end of the central body, opposed first and second ends, and a first latch opening spaced from one of the first pair of bores;
    a first releasable latching mechanism disposed within the central body including a first latch slidably mounted within the first latch opening; and
    a first securing assembly disposed on the first end of the central body, the first securing assembly including:
        a) a first fixed arm having a first attachment portion fixedly secured within the central body and a first gripping portion extending outwardly from the first attachment portion, the first gripping portion including one of a first notch or a first tab; and
        b) a first pivoting arm having a first aligning sleeve pivotably secured to the central body and a first gripping portion extending outwardly from the first aligning sleeve and including the other of the first notch or the first tab, the first aligning sleeve having an inner dimension greater than the outer dimension of the central body, a first pair of opposed apertures aligned with the first pair of opposed bores in the central body, and a first latch hole releasably engagable with the first latching mechanism.

8. The apparatus of claim 7 further comprising:
    a second pair of opposed bores spaced from the first pair of opposed bores;
    a second releasable latching mechanism disposed within the central body, the second latching mechanism including a second latch slidably mounted within a second latch opening spaced from the first latch opening; and
    a second securing assembly disposed on the second end of the central body, the second securing assembly including:
        a) a second fixed arm having a second attachment portion fixedly secured within the central body and a second gripping portion extending outwardly from the second attachment portion, the second gripping portion including one of a second notch or a second tab opposite the second attachment portion; and
        b) a second pivoting arm having a second aligning sleeve pivotally secured to the central body and a second gripping portion extending outwardly from the second aligning sleeve and including the other of the second notch or the second tab, the second aligning sleeve having an inner dimension greater than the outer dimension of the central body, a second pair of opposed apertures aligned with the second pair of opposed bores in the central body, and a second latch hole releasably engagable with the second latching mechanism.

9. The apparatus of claim 7 wherein the central body includes a first hollow tube having an inner diameter and an outer diameter, and a second hollow tube having an inner diameter and an outer diameter smaller than the inner diameter of the first tube, the second tube having one end slidably mounted within the first tube.

10. The apparatus of claim 9 wherein the first tube includes a resilient seal disposed on the first tube adjacent the second tube that defines a tube opening that receives and frictionally engages the second tube.

11. The apparatus of claim 10 wherein the second tube includes a detent secured to the one end of the second tube disposed within the first tube the detent engagable with the seal to retain the second tube within the first tube.

12. The apparatus of claim 9 wherein the first securing assembly is disposed on the first tube.

13. The apparatus of claim 12 further comprising:
a second pair of opposed bores on the second tube;
a second releasable latching mechanism disposed within the second tube and including a second latch slidably mounted within a second latch opening in the second tube; and
a second securing assembly disposed on the second tube, the second securing assembly including:
a) a second fixed arm having a second attachment portion fixedly secured within the second tube and a second gripping portion extending outwardly from the second attachment portion, the second gripping portion including one of a second notch or a second tab; and
b) a second pivoting arm having a second aligning sleeve pivotally secured to the second tube and a second gripping portion extending outwardly from the second aligning sleeve and including the other of the second notch or the second tab, the second aligning sleeve having an inner dimension greater than the outer dimension of the second tube, a second pair of apertures aligned with the second pair of opposed bores in the second tube, and a second latch hole releasably engagable with the second latching mechanism.

14. A bicycle beam adapted for engagement with a bicycle to enable the bicycle to be engaged with a vehicle-mounted carrier, comprising:
an axially extending central body defining opposed first and second ends; and
a releasable engagement arrangement at each end of the central body, wherein each of the releasable engagement arrangements comprises a pair of rigid, self-supporting arms extending outwardly from one of the ends of the central body, wherein at least one of the arms is movable relative to the central body toward and away from the other of the arms for movement between an open position and a closed position, wherein the arms are disposed in a first plane and wherein the direction of movement of the movable arm is in the first plane, wherein the arms are configured to define an upwardly facing opening when the arms are in the closed position within which a vertically extending component of the bicycle is adapted to be received, and wherein the arms define ends that are spaced apart from each other when the arms are in the open position to enable the vertically extending component of the bicycle to be positioned between the arms, wherein the rigidity of the arms enables the arms to engage a horizontally extending component of the bicycle to support the bicycle from the vehicle-mounted carrier.

15. The bicycle beam of claim 14, wherein the pair of arms define ends which are located adjacent each other when the movable arm is in its closed position, and further comprising engagement structures associated with the ends of the arms for maintaining the arms together in the first plane when the arms are in the closed position, against forces applied to the arms by the horizontally extending component of the bicycle in a direction transverse to the first plane.

16. The bicycle beam of claim 14, further comprising releasable retainer mechanisms interposed between each movable arm and the central body, for selectively maintaining the movable arms in their closed positions.

17. A bicycle beam adapted for engagement with a bicycle to enable the bicycle to be engaged with a vehicle-mounted carrier, comprising:
an axially extending central body defining opposed first and second ends;
a releasable engagement arrangement at each end of the central body, wherein at least one of the releasable engagement arrangements comprises a pair of arms extending outwardly from one of the ends of the central body, wherein at least one of the arms is movable relative to the central body toward and away from the other of the arms for movement between an open position and a closed position, wherein the arms are disposed in a first plane and wherein the direction of movement of the movable arm is in the first plane; and
a releasable retainer mechanism interposed between the movable arm and the central body, for selectively maintaining the movable arm in its closed position, wherein the movable arm includes a transversely open sleeve located inwardly of a pivot axis about which the movable arm is movable relative to the central body, wherein the sleeve is placed about the central body when the movable arm is in its closed position, and wherein the releasable retainer arrangement includes a spring biased latch member mounted to the shaft member inwardly of the pivot axis, and a latch hole associated with the sleeve within which the latch member is received, for releasably maintaining the movable arm in its closed position.

18. A method for adapting a frame of a bicycle in order to secure the bicycle on a vehicle-mounted bicycle rack, the method comprising the steps of:
a) providing a beam comprising a central body having an outer dimension, first opposed bores at one end of the central body, opposed first and second ends and a first latch opening spaced from one of the opposed bores, a first releasable latching mechanism carried by the central body and including a first latch slidably retained within the first latch opening, and a first securing assembly disposed on the first end of the central body, the first securing assembly including a first fixed arm having a first attachment portion secured to the central body and a first gripping portion extending outwardly from the first attachment portion, and a first pivoting arm pivotably secured to the central body, wherein the first pivoting arm includes a first sleeve and a first gripping portion extending outwardly from the first sleeve, the first sleeve having an inner dimension greater than the outer dimension of the central body, a first pair of opposed apertures aligned with the first opposed bores in the central body and a first latch hole selectively alignable with the first latch opening and releasably engagable with the first latching mechanism;

b) opening the first securing assembly;

c) positioning the first fixed arm and first pivoting arm of the first securing assembly on opposite sides of a component of the bicycle; and d) closing the first securing assembly.

19. The method of claim 18 wherein the step of opening the first securing assembly comprises the steps of:

a) depressing the first latch into the central body through the first latch hole and the first latch opening; and b) pivoting the first pivoting arm away from the first fixed arm.

20. The method of claim 18 wherein the step of closing the first securing assembly comprises the steps of:

a) depressing the first latch into the central body through the first latch opening;

b) pivoting the first pivoting arm towards the first fixed arm; and c) releasing the first latch to extend through the first latch opening in the central body and the first latch hole in the first sleeve.

21. The method of claim 18 further comprising the step of engaging the central body with a component of the bicycle by:

a) providing second opposed bores and a second latch opening spaced from one of the second opposed bores;

b) providing a second releasable latching mechanism carried by the central body and including a second latch slidably retained within the second latch opening;

c) providing a second securing assembly disposed on the central body, the second securing assembly including a second fixed arm having a second attachment portion secured to the central body and a second gripping portion extending outwardly from the second attachment portion, and a second pivoting arm having a second sleeve pivotally secured to the central body and a second gripping portion extending outwardly from the second sleeve, the second sleeve having an inner dimension greater than the outer dimension of the central body, a second pair of opposed apertures aligned with a second pair of opposed bores in the central body and a second latch hole alignable with the second latch opening and releasably engagable with the second latching mechanism;

d) opening the second securing assembly;

e) positioning the second fixed arm and second pivoting arm of the second securing assembly on opposite sides of a component of the bicycle; and f) closing the second securing assembly.

22. The method of claim 21 wherein the step of opening the second securing assembly comprises the steps of:

a) depressing the second latch into the central body through the second latch hole and the second latch opening; and b) pivoting the second pivoting arm away from the second fixed arm.

23. The method of claim 18 wherein the first securing assembly further includes one of a tab or a notch disposed on the first gripping portion of the first fixed arm, and the other of the tab or the notch disposed on the first gripping portion of the first pivoting arm opposite the first sleeve, and wherein the step of closing the first securing assembly further comprises the step of engaging the tab with the notch.

* * * * *